United States Patent
Adams et al.

(10) Patent No.: US 7,300,507 B2
(45) Date of Patent: Nov. 27, 2007

(54) EMULSION INK

(75) Inventors: John Christopher Adams, Stirling (GB); John Hamilton, Perthshire (GB)

(73) Assignees: GR Advanced Materials Ltd., Stirling; Tohoku Ricoh Co., Ltd, Shibata-machi, Shibata-gun, Miyagi (JP)

( * ) Notice: Subject to any disclaimer, the term of this patent is extended or adjusted under 35 U.S.C. 154(b) by 0 days.

(21) Appl. No.: 11/267,375

(22) Filed: Nov. 4, 2005

(65) Prior Publication Data
US 2006/0100309 A1 May 11, 2006

(30) Foreign Application Priority Data
Nov. 5, 2004 (GB) ................. 0424505.6

(51) Int. Cl.
*C09D 11/00* (2006.01)
(52) U.S. Cl. ............. 106/31.6; 106/31.9; 523/160; 523/161
(58) Field of Classification Search ............. 106/31.26, 106/31.9; 523/160, 161
See application file for complete search history.

(56) References Cited

U.S. PATENT DOCUMENTS

| | | | | |
|---|---|---|---|---|
| 3,279,935 A | * | 10/1966 | Alton et al. ............. | 106/478 |
| 3,717,494 A | * | 2/1973 | Jager et al. ............. | 106/474 |
| 3,992,218 A | * | 11/1976 | Suetsugu et al. ......... | 106/478 |
| 4,203,877 A | | 5/1980 | Baker | |
| 4,918,123 A | | 4/1990 | Yang et al. | |
| 5,226,957 A | | 7/1993 | Wickramanayake et al. | |
| 5,395,435 A | * | 3/1995 | Mizobuchi ............... | 106/31.26 |
| 5,573,578 A | | 11/1996 | Okuda | |
| 5,622,548 A | | 4/1997 | Zou et al. | |
| 5,718,747 A | * | 2/1998 | Okusawa ................. | 106/31.26 |
| 5,738,715 A | * | 4/1998 | Okuda et al. ........... | 106/31.26 |
| 5,779,777 A | | 7/1998 | Okuda et al. | |
| 5,853,466 A | | 12/1998 | Matsuura et al. | |
| 5,880,214 A | | 3/1999 | Okuda | |
| 5,902,388 A | | 5/1999 | Matsuura et al. | |
| 5,948,151 A | * | 9/1999 | Ono et al. ............... | 106/31.26 |
| 6,149,720 A | * | 11/2000 | Asada et al. ............ | 106/31.26 |
| 6,156,109 A | * | 12/2000 | Asada ..................... | 106/31.26 |
| 6,165,258 A | * | 12/2000 | Asada ..................... | 106/31.26 |
| 6,527,842 B1 | | 3/2003 | Adams et al. | |
| 6,632,272 B2 | | 10/2003 | Hayashi et al. | |
| 6,632,273 B2 | | 10/2003 | Hayashi et al. | |
| 6,699,312 B2 | | 3/2004 | Hayashi et al. | |
| 7,008,474 B2 | * | 3/2006 | Konno et al. ............ | 106/31.26 |
| 7,037,364 B2 | * | 5/2006 | Hamilton et al. ........ | 106/31.26 |
| 2002/0124770 A1 | | 9/2002 | Hayashi | |
| 2006/0036000 A1 | * | 2/2006 | Adams ..................... | 523/160 |

FOREIGN PATENT DOCUMENTS

DE 4 202 065 7/1993

(Continued)

OTHER PUBLICATIONS

Derwent abstract of JP08/218023, Aug. 1996.*
European Search Report, dated Mar. 23, 2006.

*Primary Examiner*—Helene Klemanski

(57) ABSTRACT

A water-in-oil emulsion ink comprises a water phase and an oil phase, wherein the water phase comprises a carbon black pigment having a pH of less than 6. The emulsion ink maintains stable rheology on ageing.

8 Claims, 1 Drawing Sheet

FOREIGN PATENT DOCUMENTS

| | | |
|---|---|---|
| EP | 0000424 | 1/1979 |
| EP | 0623630 | 11/1994 |
| EP | 0 778 323 A2 | 6/1997 |
| EP | 0 778 324 A1 | 6/1997 |
| GB | 2117398 | 10/1983 |
| GB | 2 354 767 | 4/2001 |
| GB | 2 408 050 A | 5/2005 |
| JP | 08/218023 * | 8/1996 |
| JP | 11001648 A | 1/1999 |
| WO | WO 96/07689 | 3/1996 |

* cited by examiner

EMULSION INK

FIELD OF INVENTION

The present invention relates to water-in-oil emulsion inks for use in digital duplicators and, in particular, to a method of formulating black inks so that ink rheology and stability can be optimised.

BACKGROUND OF THE INVENTION

Digital duplicator printing is a rotary printing process in which a stencil containing pixel image voids is mounted on the circumference of a drum which contains printing ink and which is located in a printing machine. The drum circumference is a mesh screen. To make prints, sheets of paper are passed under the drum in point contact as it rotates, inks being forced through the screens and stencil on to the paper.

It is well known to use water-in-oil emulsion inks for this printing process. The inks may contain a pigment in the water or oil phase. Inks which contain pigment in the water phase can provide a number of advantages. Typically, better image density and reduced set-off are achieved in comparison with similar inks with pigment in the oil phase. For example, EP-A-778323 describes water-in-oil emulsion inks comprising carbon black in the water phase. It is claimed that by selecting carbon black having a pH value in the range 6 to 10 it is possible to achieve, amongst other properties, excellent emulsion stability. Inks containing carbon with a pH value outside this range are claimed to exhibit droplet size enlargement, phase separation and other changes that characterise instability of the emulsion. Inks undergoing these types of change become progressively more fluid.

In our investigation of such systems we have found that while it is possible to achieve inks which are resistant to the above-described changes, it is also possible for these inks to undergo an equally detrimental process of change whereby they become thicker in consistency as they age. This change is evidenced by a significant increase in rheological measures such as yield value and PPP value. PPP is a measurement of the spread of a defined volume of ink between two glass plates (Parallel Plate Plastometer). This method is described by A Voet in American Ink Maker, Volume 28, 1950.

Such changes in rheology can have an adverse effect on the performance of the ink in a digital duplicator. Typical problems include difficulty in pumping ink from the cartridge in which it is supplied, leading to a high residue of unused ink when the cartridge is discarded and a consequent increase in the cost of printing. There may also be adverse effects on printing properties such as ink consumption and image recovery, which is the number of prints required to achieve full image quality when resuming printing after a period of non-use.

A further problem which is encountered when formulating water-in-oil emulsion inks with pigment in either the water phase or the oil phase is the difficulty in adjusting ink rheology independently of the water content of the emulsion. The volume of the dispersed phase (Awater content@) of water-in-oil emulsion inks plays a critical role in determining their physical and printing properties. In particular, this parameter is of fundamental importance in determining the flow properties of the ink. Inks for use in digital duplicators require their flow properties to be controlled and limited in order to prevent the occurrence of tail flooding. Tail flooding is a printing defect whereby the layer of ink, which is held between the digital stencil and the screens on the surface of the printing drum, exudes from under the trailing edge of the stencil during the printing process. This leads to a catastrophic failure in print quality, as ink is transferred on to the impression roller and thence as spurious marks on to the back of the paper sheets being printed. Such defects due to excessive ink flow can often be remedied by increasing the water content of the ink. However in so doing, other Theological properties of the ink are changed, and in particular the ink suffers an increase in PPP and yield value. Circumstances can therefore arise where control of ink flow can only be achieved at the expense of creating very stiff paste inks, i.e., inks with very high PPP and yield values. It would, therefore, be very desirable to have the means of adjusting these parameters independently of any adjustment to the water content of the ink.

It is an objective of the present invention to achieve a water-in-oil emulsion ink comprising a dispersion of carbon pigment in the water phase which maintains stable rheology on ageing. A further objective is to provide a means whereby it is possible to adjust rheological parameters such as yield value independently of any adjustment to the water content of the ink.

SUMMARY OF THE INVENTION

According to the present invention, a water-in-oil emulsion ink comprises a water phase and an oil phase, wherein the water phase comprises a carbon black pigment having a pH of less than 6.

In one embodiment, the water phase of the ink may comprise a blend of carbon black pigment having a pH of less than 6 together with a weakly acid, neutral or alkaline carbon black pigment, having a pH of at least 6.

In another, preferred, embodiment the water phase comprises a water-soluble resin, such as polyvinyl pyrrolidone, as a pigment dispersant in the substantial absence of any surfactant, either as a co-dispersant or as a component of an emulsion resin within the water phase.

While not wishing to be bound by theory, it is thought that the improved stability achieved in the ink of the present invention depends on the net electric charge which resides on the particles of carbon pigment when dispersed in water. It is known as a general rule that to achieve pigment dispersions with good stability, it is desirable to achieve stabilisation by both steric effects, such as achieved by a resin dispersant, and also electrostatic stabilisation, as the result of electrostatic repulsion between like charged particles which acts to prevent pigment flocculation. For carbon particles dispersed in water, electrostatic properties will be determined by the functional groups on the surface of the particles. The groups also determine the pH value of the carbon dispersion.

In the case of strongly acid carbon types (defined as having a pH of less than 6 in the context of this Application) these groups will be substantially ionised, resulting in a significant negative charge on the surface of the pigment. It can be appreciated that electrostatic repulsion between particles in these dispersions will act to prevent the processes of pigment flocculation which are thought to give rise to the increases in PPP and yield values seen in prior art inks. Presumably as a direct result of the enhanced electrostatic stabilisation provided by strongly acid carbon, inks which are based solely on this carbon type are very fluid and are found to have relatively low PPP and yield values. However, when formulated in accordance with the above-described preferred embodiment of the present invention, the resulting inks exhibit good stability with consistent rheology and an absence of phase separation even when stored an elevated temperatures. Such inks find use in digital duplicators where the drum is provided with several multiples of screen layers and where there is little or no squeegee action from inside the drum to force ink on to the printing paper.

For other types of digital duplicator where a more paste-like structure and lower flow properties are required, excellent results can be achieved in inks where the carbon dispersion comprises a blend of acid carbon and weakly acid, neutral or alkaline carbon (pH of at least 6). By selection of appropriate proportions of the two types of carbon it is possible to achieve inks in accordance with the preferred embodiment which do not demonstrate excessive increases in yield value or PPP on ageing. It is thought that the tendency of the weakly acid, neutral or alkaline carbon to cause a change in ink structure by pigment flocculation is much reduced as a result of the increased separation between these particles in the pigment dispersion through the inclusion of the acid carbon. Also by adjusting the relative proportions of the two different types of carbon, it is possible for the formulations to achieve the exact rheology required, independently of any adjustment to the volume of the water phase within the ink.

DETAILED DESCRIPTION OF THE PREFERRED EMBODIMENTS

Figure 1:
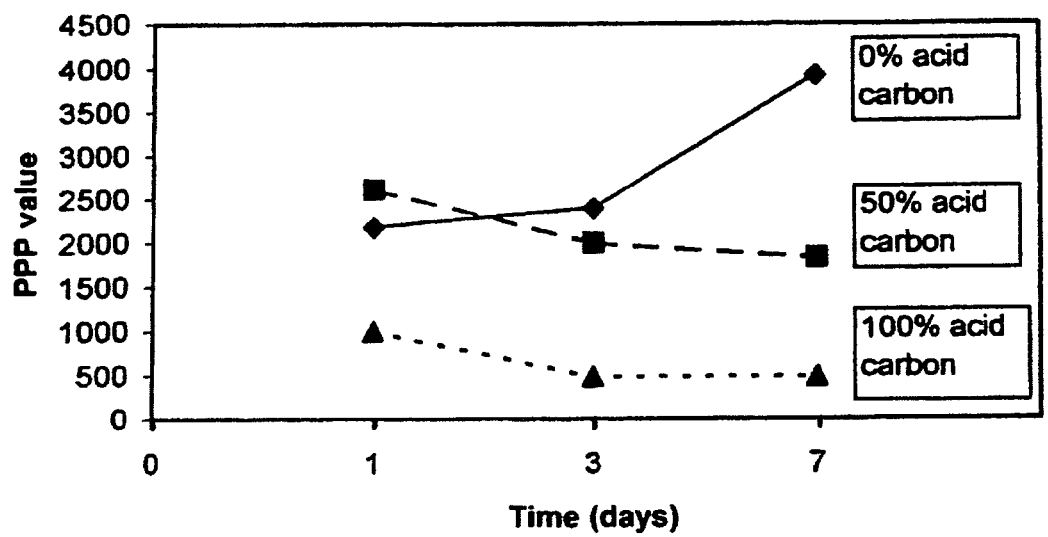
FIG. 1 is a graph showing the variation in PPP with time for the emulsion inks of Examples 1 to 3 containing different amounts of acid carbon (pH less than 6).

Inks according to the present invention are water-in-oil emulsion inks comprising a water phase dispersed within an oil phase.

The water phase comprises acid carbon having a pH of less than 6, preferably less than 5.5, dispersed in water. Optionally the water phase may also comprise a dispersion of a weakly acid, neutral or alkaline carbon, having a pH of 6 or greater. In the context of this Application, the pH of the carbon black pigment is determined by measuring the pH of the water phase of the ink in the absence of any pH-adjusting agent, at room temperature, typically at 20 to 23° C.

Carbon black pigments representing the above two different ranges of acidity are well known and commercially available. These pigments are frequently categorised on the basis of the process by which they were manufactured, giving rise to types such as furnace black, gas black, acetylene black and the like. The specific manufacturing process employed does have a significant effect on the acidity of the resultant carbon, particularly where oxidative processes are used to make the pigment more acid by causing the formation of acid groups on the pigment surface. However, other factors such as the purity of the raw material feedstock also have a critical bearing on the acidity of the resultant pigment. Therefore, in order to implement the teaching of this invention account must be taken of the pH of the specific grade of carbon selected rather than simply selecting a generic type of carbon pigment.

Typically, the carbon black pigments are present in the ink at an average particle size of less than 10 μm, preferably less than 5 μm, more preferably less than 2 μm, and most preferably less than 1 μm.

Typically, the total carbon black pigment concentration will fall within the range 1 to 20% by weight, preferably 2 to 15% by weight, and more preferably 3 to 9% by weight of the total ink.

When a blend of carbon black pigments having different pH values is used the preferred portion of acid carbon black pigment (pH less than 6) in the total carbon black blend is typically in the range 20 to less than 100% by weight.

The carbon black pigment may be dispersed in the water phase using any type of dispersing agent including anionic, non-ionic and cationic surfactants and also high molecular weight dispersants including resin dispersants. Where surfactants are used as dispersing agents, care is required to ensure that good emulsion stability is achieved as well as a satisfactory quality of pigment dispersion.

In a preferred embodiment of this invention a water-soluble resin is used as a pigment dispersant. Suitable water-soluble resins include homopolymers and copolymers of N-vinyl pyrrolidone. The water-soluble resin may be present in an amount of 0.5 to 30% by weight, preferably 1 to 20% by weight, of the water phase of the ink.

When a water-soluble resin is used to disperse carbon black pigment in the water phase, it is particularly preferred that the water phase should be substantially free, and most preferably entirely free, of any surfactant. In this regard, it should be noted that the use of emulsion resins should generally be avoided since they frequently contain surfactants, present as emulsifying agents for the precursor monomers.

In the context of the present Application, by substantially free of any surfactant we mean any surfactant present is only present in such a small amount so as not to adversely affect the ink capacitance properties, and therefore the ink detection properties, and so as not to function as a dispersant for the carbon black pigment in the water phase.

The water phase may also comprise other conventional ink components, such as antifreeze agents, fillers, emulsion stabilisers, gellants and biocides.

The water phase typically comprises 20 to 85% by weight, preferably 50 to 80% by weight, of the total ink.

The oil phase comprises an oil or oil blend. The oil may be a paraffinic or naphthenic mineral oil or a synthetic hydrocarbon such as polybutene, a hydrocarbon distillate, silicone oil or a vegetable oil such as rapeseed oil, castor oil, soybean oil including synthetic derivatives such as soybean oil esters, or any blend thereof.

The oil phase typically also comprises an emulsifying agent, which may comprise any material capable of creating a water-in-oil emulsion in conjunction with the chosen oils and water phase. However, an emulsifying agent may instead or additionally be included in the water phase, provided that this does not adversely affect ink monitoring properties, as described above. Typical emulsifying agents for incorporation into the oil phase include but are not restricted to sorbitan esters such as sorbitan mono-oleate or sorbitan sesquioleate, lipids such as soya lecithin and polymeric emulsifying agents. A single emulsifying agent may be used or a blend of different emulsifying agents. In a particular embodiment a blend of sorbitan ester, such as sorbitan mono-oleate, is used in conjunction with a polymeric emulsifier which is an ABA block copolymer of polyester-polyethylene oxide-polyester prepared by the reaction of 12-hydroxystearic acid with polyethylene oxide.

The oil phase may optionally contain a dissolved resin, fillers, waxes and/or antioxidants.

The emulsion ink is prepared by combining the water and oil phases using mixing processes known from the prior art.

The present invention is further illustrated by reference to the following Examples and the accompanying Figures.

EXAMPLES

Example 1

Acid carbon (pH less than 6) was added to an aqueous solution of polyvinyl pyrrolidone, glycerol and a biocide solution containing a blend of methyl isothiazolinone and benzisothiazolinone, and stirred with a toothed wheel at high speed to create a coarse dispersion of the carbon. The dispersion was milled in a Netzsch Minizeta horizontal bead mill containing zirconia grinding beads (0.4-0.7 mm) to achieve a maximum particle size of less than 1 μm.

The milled carbon dispersion was combined with a further quantity of water, representing 35.1% by weight of the total ink formulation, to create the water phase shown in Table 1, below, in which the amounts of the different components are in grams. The pH of this water phase was 4.2.

An oil phase was prepared in accordance with Table 1 by blending a high viscosity naphthenic oil (41-43 cSt at 40° C.) with a low viscosity naphthenic oil (12-14 cSt at 40° C.) together with two emulsifying agents, sorbitan mono-oleate and an ABA polyester-polyethylene oxide-polyester block copolymer prepared by the reaction of 12-hydroxystearic acid and polyethylene oxide.

An emulsion ink was prepared by slow addition of the water phase to the oil phase which was stirred at high speed using a tooth wheel stirrer. Stirring was continued after addition of the water phase to ensure that the ink was homogeneous.

After standing overnight for approximately 16 hours the ink viscosity and yield value were measured (Casson model) using a Bohlin model CS10 rheometer equipped with a 25 mm diameter cone, 2° angle, at 23° C. for a shear stress range of 10.24 to 512 Pa. The PPP value was also measured using a parallel plate plastometer, at 20 to 23° C. These measurements were repeated 3 days and 7 days after making the ink. A second sample was kept at a temperature of 70° C. for 7 days before measuring viscosity, yield value and PPP value. By an approximation of Arrhenius' Law this storage at elevated temperature is taken to replicate a storage period in excess of 6 months at room temperature.

Example 2

Using a neutral carbon pigment which yielded a water phase pH value of 7.3, an ink was prepared in accordance with the formulation in Table 1 using exactly the same method as for Example 1. Ink rheology was characterised by the same methods as Example 1.

Example 3

A water phase was prepared in accordance with Table 1, below, by blending equal proportions of the water phases from Examples 1 and 2. The pH of the water phase was 5.6. Thereafter an emulsion ink was prepared and characterised using exactly the same methods as Example 1.

The results obtained for Examples 1 to 3 are also provided in Table 1, below, and are depicted graphically in the FIGS. 1 and 2.

Figure 2:
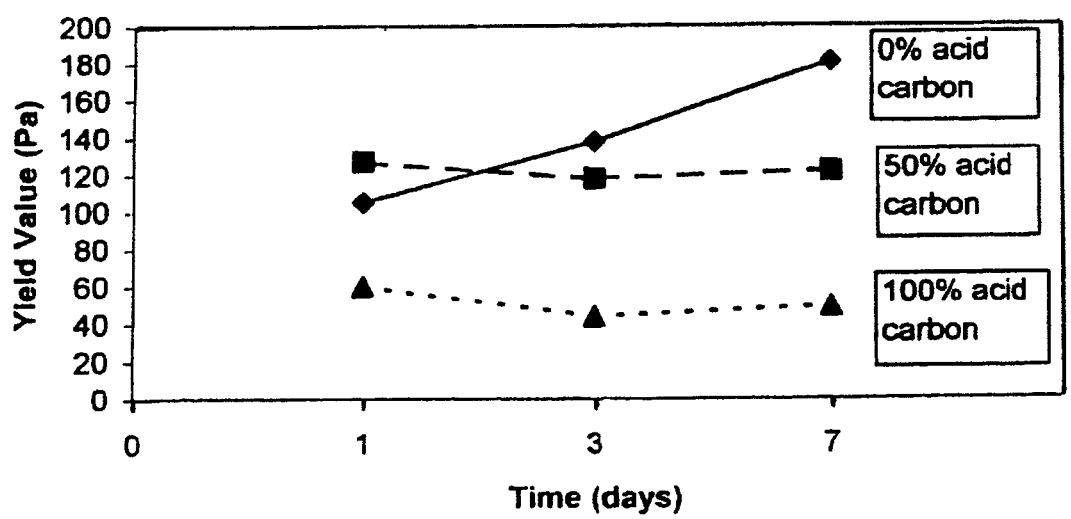
FIG. 2 is a graph showing the variation in yield value with time for the emulsion inks of Examples 1 to 3 containing different amounts of acid carbon pH less than 6).

From Table 1 and FIGS. 1 and 2 it can be seen that inks comprising acid carbon (pH less than 6) exhibit a small initial decrease in results for PPP and yield value measurements which thereafter become relatively stable as the ink ages. This trend is confirmed by results of the accelerated aging tests at 70° C. where there is generally little change from the initial measurements taken before ageing. By contrast, the ink of Example 2, comprising only carbon with a pH of greater than 6, shows a continuing process of increase for both PPP and yield value measurements to the point that after 7 days the ink structure is so thick that it is unusable for most applications.

The ink of Example 1, comprising only acid carbon, has significantly lower PPP and yield values than the ink of Example 3, comprising a blend of acid and neutral carbon types. These examples thereby demonstrate how, by selection of the relative proportions of these carbon types, it is possible to achieve stable inks with consistencies which vary from liquid to paste.

Example 4

An ink was prepared by the method described for Example 1 except that the carbon dispersion was prepared by milling a coarse dispersion comprising a 50:50 blend of acid carbon (pH less than 6) and carbon having a pH greater than 6. The water phase was prepared from the milled carbon dispersion by adding water equivalent to 31.1% of the final ink. This ink omits the polymeric emulsifying agent used in the other Examples.

From the results provided in Table 1 it can be seen that the stability claimed for this invention does not rely on the incorporation of the polymer, since Example 4 ink maintains its structure for a period of at least 21 weeks at 60° C. By an approximation of Arrhenius' law, this period is taken to equate to a period greater than 6 years at room temperature (typically 20 to 23° C.).

The pH of the carbon black pigments and the water phase were determined at 20 to 23° C. using a pH meter (Hanna Instruments H1 8424 with VWR probe) after calibration with standard buffer solutions at pH 4 and pH 7.

|  |  | EXAMPLE | | | |
|---|---|---|---|---|---|
|  |  | 1 | 2 | 3 | 4 |
| | pH of water phase | 4.2 | 7.3 | 5.6 | 5.0 |
| Water Phase | Carbon (pH < 6) | 7.3 | — | 3.65 | 3.65 |
| | Carbon (pH > 6) | — | — | 3.65 | 3.65 |
| | Polyvinyl pyrrolidone | 3.7 | 3.7 | 3.7 | 3.7 |
| | Water | 55.7 | 55.7 | 55.7 | 55.7 |
| | Glycerol | 7.0 | 7.0 | 7.0 | 7.0 |
| | Biocide solution | 0.3 | 0.3 | 0.3 | 0.3 |
| Oil Phase | High viscosity naphthenic oil | 14.2 | 14.2 | 14.2 | 14.2 |
| | Low viscosity naphthenic oil | 6 | 6 | 6 | 6 |
| | Sorbitan mono-oleate | 4.1 | 4.1 | 4.1 | 5.8 |
| | ABA block copolymer | 1.7 | 1.7 | 1.7 | — |
| Total Ink | | 100 | 100 | 100 | 100 |
| Results | | | | | |
| % acid carbon | | 100 | 0 | 50 | 50 |
| PPP value 1 day | | 1001 | 2180 | 2610 | 2180 |
| PPP value 3 days | | 490 | 2390 | 2000 | — |
| PPP value 7 days | | 490 | 3920 | 1840 | — |
| PPP value 7 days/70° C. | | 1001 | 3920 | 2610 | — |
| PPP value 21 weeks/60° C. | | — | — | — | 2180 |
| Yield value (Pa) 1 day | | 60 | 105 | 127 | 84 |
| Yield value (Pa) 3 days | | 44 | 138 | 118 | — |
| Yield value (Pa) 7 days | | 49 | 181 | 122 | — |
| Yield value (Pa) 7 days/70° C. | | 68 | 188 | 144 | — |
| Yield value (Pa) 21 weeks/60° C. | | — | — | — | 101.5 |

The invention claimed is:

1. A water-in-oil emulsion ink comprising a water phase and an oil phase, wherein the water phase comprises a first carbon black pigment having a pH of less than 6 and a second carbon black pigment having a pH of at least 6.

2. An ink according to claim 1, wherein the first carbon black pigment has a pH of less than 5.5.

3. An ink according to claim 1, wherein the first carbon black pigment is dispersed in the water phase by a water-soluble resin.

4. An ink according to claim 3, wherein the water-soluble resin is a homopolymer or copolymer of N-vinyl pyrrolidone.

5. An ink according to claim 3, wherein the water phase is substantially free of any surfactant.

6. An ink according to claim 1, wherein the oil phase comprises an ABA block copolymer prepared from 12-hydroxystearic acid and polyethylene oxide.

7. An ink according to claim 1, wherein the water phase does not contain sodium hydroxide.

8. An ink according to claim 1, wherein the water phase does not contain a pH-adjusting agent.

* * * * *